(12) United States Patent
Ito

(10) Patent No.: US 10,804,784 B2
(45) Date of Patent: Oct. 13, 2020

(54) ACTUATOR

(71) Applicant: Murata Manufacturing Co., Ltd., Nagaokakyo-shi, Kyoto-fu (JP)

(72) Inventor: Shingo Ito, Nagaokakyo (JP)

(73) Assignee: MURATA MANUFACTURING CO., LTD., Kyoto (JP)

(*) Notice: Subject to any disclaimer, the term of this patent is extended or adjusted under 35 U.S.C. 154(b) by 54 days.

(21) Appl. No.: 16/352,894

(22) Filed: Mar. 14, 2019

(65) Prior Publication Data
US 2019/0207500 A1 Jul. 4, 2019

Related U.S. Application Data

(63) Continuation of application No. PCT/JP2018/016772, filed on Apr. 25, 2018.

(30) Foreign Application Priority Data

Apr. 27, 2017 (JP) .................. 2017-088551

(51) Int. Cl.
*H02K 33/16* (2006.01)
*H02K 33/02* (2006.01)
(Continued)

(52) U.S. Cl.
CPC ............. *H02K 33/16* (2013.01); *B06B 1/045* (2013.01); *H02K 3/02* (2013.01); *H02K 3/26* (2013.01);
(Continued)

(58) Field of Classification Search
CPC .......... H02K 33/16; H02K 33/02; H02K 3/30; H02K 33/18; H02K 3/02; H02K 3/26; H02K 2203/03; B06B 1/045
(Continued)

(56) References Cited

U.S. PATENT DOCUMENTS 7,027,682 B2 * 4/2006 Ruan .................. G02B 6/358
385/16
10,147,529 B2 * 12/2018 Nishino ............. H02K 41/0356
(Continued)

FOREIGN PATENT DOCUMENTS

JP 2009-240044 A 10/2009
JP 2016-208607 A 12/2016
(Continued)

OTHER PUBLICATIONS

Official Communication issued in International Patent Application No. PCT/JP2018/016722, dated Jul. 17, 2018.

*Primary Examiner* — John K Kim
(74) *Attorney, Agent, or Firm* — Keating & Bennett, LLP

(57) ABSTRACT

An actuator includes a coil that provides a magnetic field to move a permanent magnet in a moving direction perpendicular to a coil axis. The coil includes conductor patterns on an insulating base material layer. The permanent magnet is located above insulating base material layer so that a polar direction of the permanent magnet is the moving direction. The conductor patterns include a closest conductor pattern closest to the permanent magnet. A first maximum width of an interval inside the closest conductor pattern in the polar direction is smaller than a second maximum width of an interval inside another conductor pattern in the polar direction. An overlapping width in the polar direction between the interval of the first maximum width inside the closest conductor pattern and the permanent magnet is the first maximum width regardless of a position of the permanent magnet.

15 Claims, 8 Drawing Sheets

(51) Int. Cl.
  *H02K 3/26* (2006.01)
  *H02K 3/30* (2006.01)
  *H02K 33/18* (2006.01)
  *B06B 1/04* (2006.01)
  *H02K 3/02* (2006.01)

(52) U.S. Cl.
  CPC .............. *H02K 3/30* (2013.01); *H02K 33/02* (2013.01); *H02K 33/18* (2013.01); *H02K 2203/03* (2013.01)

(58) Field of Classification Search
  USPC ..................................................... 310/15, 35
  See application file for complete search history.

(56) References Cited

U.S. PATENT DOCUMENTS

| | | | |
|---|---|---|---|
| 10,600,544 B2* | 3/2020 | Nishino | H01F 7/20 |
| 2011/0169347 A1* | 7/2011 | Miyamoto | B06B 1/045 |
| | | | 310/12.21 |
| 2011/0204732 A1* | 8/2011 | Miyamoto | H02K 33/16 |
| | | | 310/25 |
| 2017/0365389 A1 | 12/2017 | Yosui et al. | |
| 2019/0207500 A1* | 7/2019 | Ito | H02K 3/02 |

FOREIGN PATENT DOCUMENTS

| | | |
|---|---|---|
| JP | 2016-218400 A | 12/2016 |
| WO | 2010/026883 A1 | 3/2010 |
| WO | 2010/050285 A1 | 5/2010 |
| WO | 2016/199516 A1 | 12/2016 |

\* cited by examiner

FIG. 7A
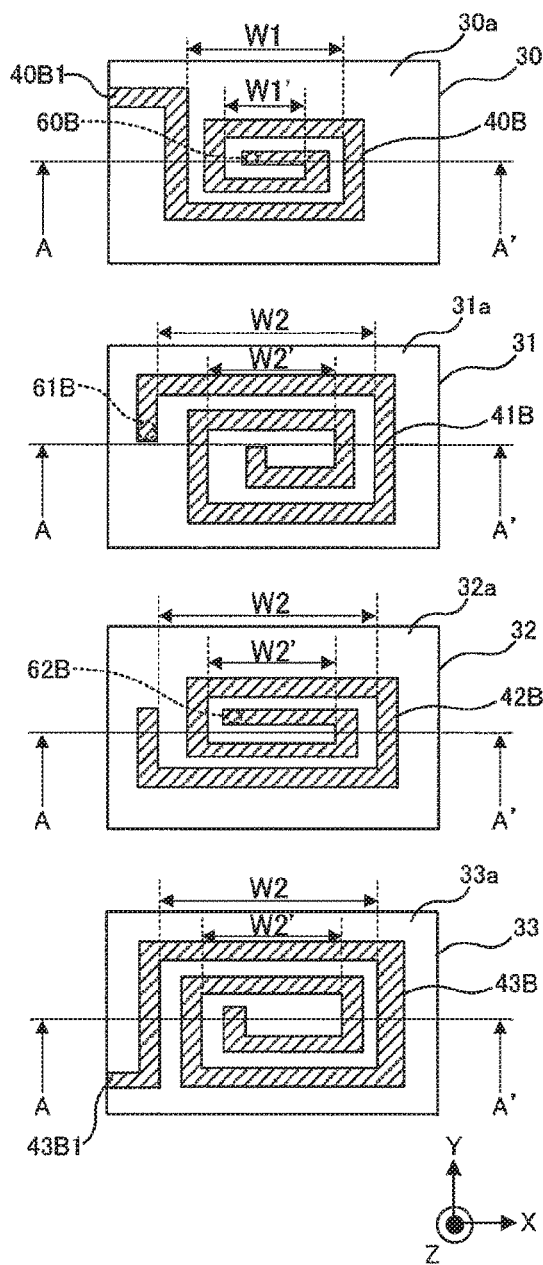
FIG. 7B
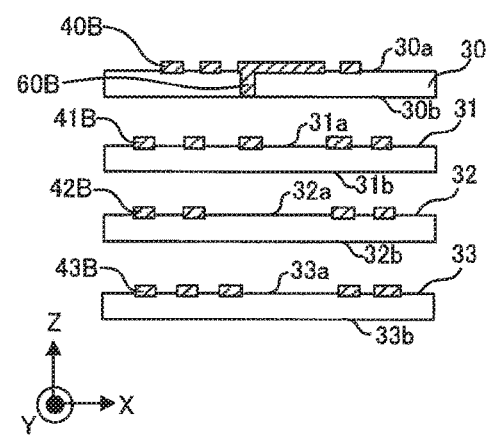
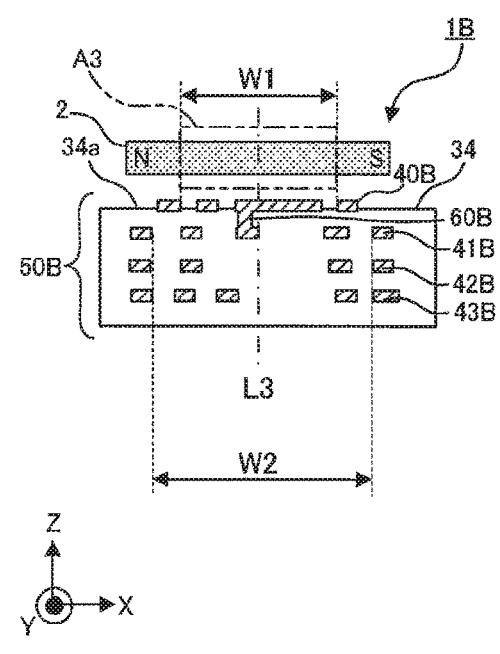
FIG. 7C

FIG. 8A
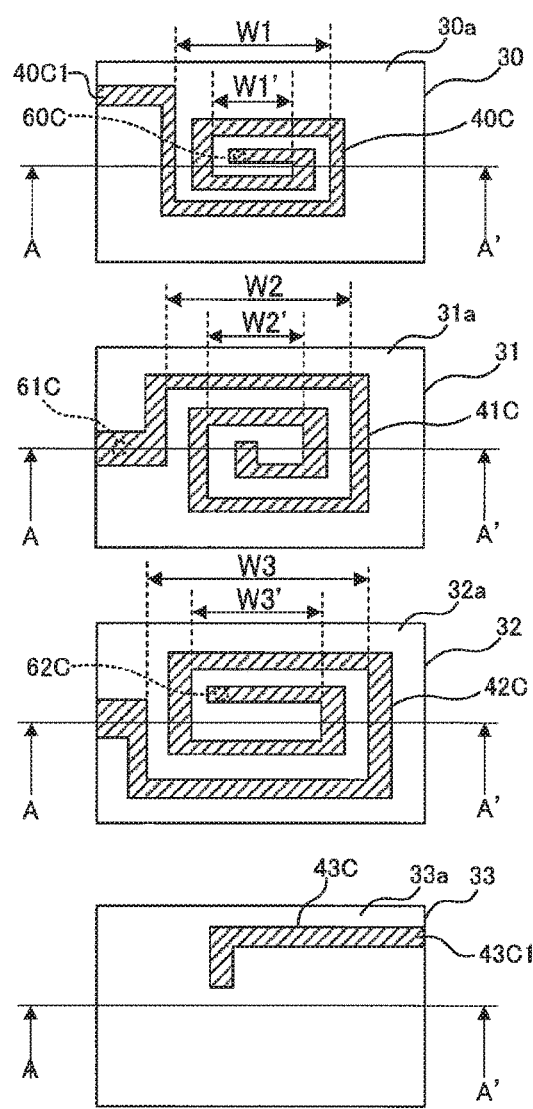
FIG. 8B
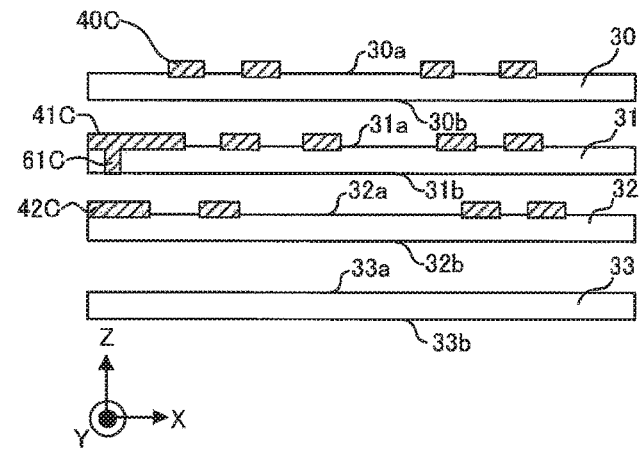
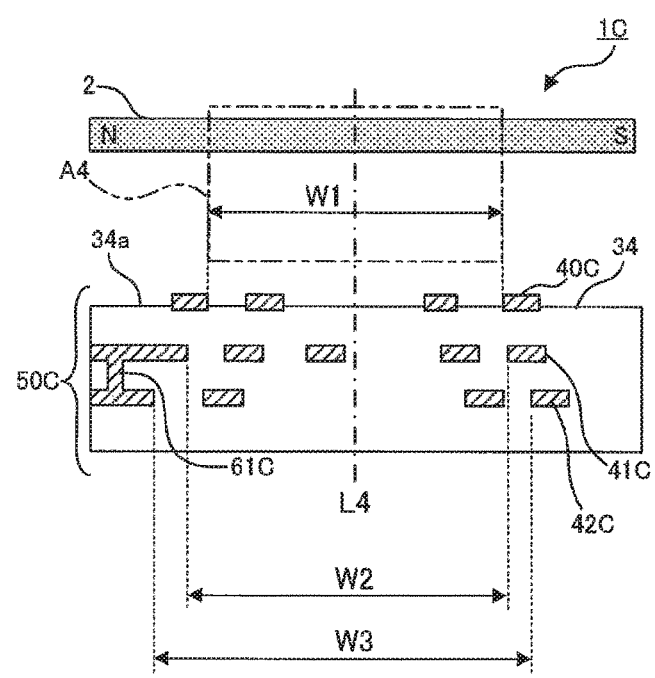
FIG. 8C

ACTUATOR

CROSS REFERENCE TO RELATED APPLICATIONS

This application claims the benefit of priority to Japanese Patent Application No. 2017-088551 filed on Apr. 27, 2017 and is a Continuation Application of PCT Application No. PCT/JP2018/016772 filed on Apr. 25, 2018. The entire contents of each of these applications are hereby incorporated herein by reference.

BACKGROUND OF THE INVENTION

1. Field of the Invention

The present invention relates to an actuator.

2. Description of the Related Art

An actuator including an electromagnet that includes a coil of a conductor pattern provided on multiple layers has conventionally been proposed.

For example, in Japanese Laid-Open Patent Publication No. 2016-218400, a coil of a conductor pattern is disposed on four sides of a printed coil board that is a quadrangular frame-shaped insulating base material, and a plurality of such printed coil boards are prepared and laminated to form a laminated coil. In Japanese Laid-Open Patent Publication No. 2016-218400, this laminated coil is allowed to face a lower surface of a movably disposed permanent magnet to form an actuator.

The actuator of Japanese Laid-Open Patent Publication No. 2016-218400 moves a permanent magnet by a magnetic field generated by a coil, and the moving direction of the permanent magnet is a direction perpendicular to a central axis of the coil. A magnetic flux density of the magnetic field generated by the coil becomes larger at a position closer to the coil and becomes smaller at a position farther from the coil. Therefore, when the permanent magnet moves in the direction perpendicular to the central axis of the coil, an electromagnetic force to the permanent magnet may abruptly change depending on a position of the permanent magnet, causing a problem of difficulty in control.

SUMMARY OF THE INVENTION

Preferred embodiments of the present invention provide actuators that each reduce or prevent an abrupt change in electromagnetic force to a permanent magnet to facilitate control of movement of the permanent magnet even when a coil is defined by a conductor pattern on an insulating base material, such that the permanent magnet disposed close to an opening of the coil is moved by a magnetic field of the coil in a direction perpendicular or substantially perpendicular to a central axis of the coil.

An actuator according to a preferred embodiment of the present invention moves a permanent magnet by a magnetic field provided by a coil in a movement direction perpendicular or substantially perpendicular to a coil axis of the coil, wherein the coil includes conductor patterns provided on a plurality of layers on an insulating base material layer and the coil axis in a direction perpendicular or substantially perpendicular to a principal surface of the insulating base material layer, wherein the permanent magnet is disposed above the principal surface in a direction of the coil axis so that a polar direction of the permanent magnet is the moving direction, the conductor patterns include a closest conductor pattern provided closest to the permanent magnet in the direction of the coil axis, a first maximum width is a maximum width of an interval inside the closest conductor pattern in the polar direction and is smaller than a second maximum width that is a maximum width of an interval inside at least one other conductor pattern in the polar direction, and an overlapping width in the polar direction between the interval of the first maximum width inside the closest conductor pattern and the permanent magnet is the first maximum width regardless of a position of the permanent magnet.

In actuators according to preferred embodiments of the present invention, even when the permanent magnet disposed close to the interval of the conductor pattern of the coil is moved by the magnetic field of the coil in the direction perpendicular or substantially perpendicular to the center axis of the coil, an abrupt change is able to be reduced or prevented in the electromagnetic force to the permanent magnet to facilitate control of the movement of the permanent magnet.

The above and other elements, features, steps, characteristics and advantages of the present invention will become more apparent from the following detailed description of the preferred embodiments with reference to the attached drawings.

BRIEF DESCRIPTION OF THE DRAWINGS

FIG. 7A is a plan view schematically showing insulating base material layers on each of which a conductor pattern is provided according to a third preferred embodiment of the present invention, FIG. 7B is a view for explaining a manufacturing method of a coil board of the third preferred embodiment of the present invention, and FIG. 7C is a side cross-sectional view schematically showing a structure of an actuator according to the third preferred embodiment of the present invention.

FIG. 8A is a plan view schematically showing insulating base material layer on each of which a conductor pattern is provided according to a fourth preferred embodiment of the present invention, FIG. 8B is a view for explaining a manufacturing method of a coil board of the fourth preferred embodiment of the present invention, and FIG. 8C is a side cross-sectional view schematically showing a structure of an actuator according to the fourth preferred embodiment of the present invention.

DETAILED DESCRIPTION OF THE PREFERRED EMBODIMENTS

Figure 1A:
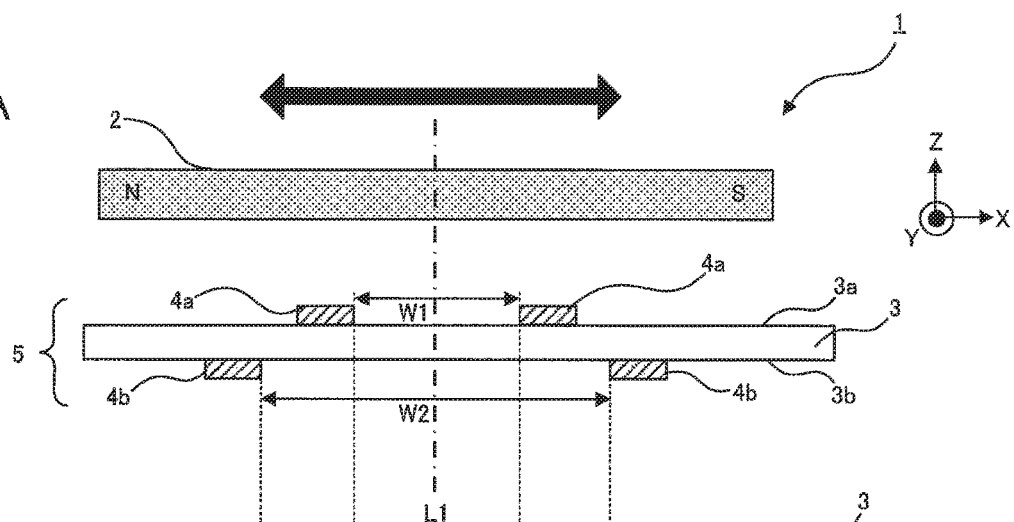
FIG. 1A is a side cross-sectional view schematically showing a structure of an actuator according to a first preferred embodiment of the present invention and FIG. 1B is a plan view schematically showing the structure of the actuator according to the first preferred embodiment of the present invention.

Various preferred embodiments of the present invention will now be described with reference to the drawings. In the drawings, corresponding members having the same or similar function are denoted by the same reference numerals. Although the preferred embodiments are separately described for convenience to facilitate explanation or understanding of main points, configurations described in different preferred embodiments may be partially replaced or combined. In second and subsequent preferred embodiments, the same features as the first preferred embodiment will not be described, and only the differences will be described. Particularly, the same advantageous effects according to the same or substantially the same configuration will not be described in each preferred embodiment.

In all of the figures, a thickness direction of an insulating base material, i.e., a lamination direction, is shown as a Z-axis direction, and in a plane orthogonal or substantially orthogonal to the Z-axis, a longitudinal direction corresponding to a direction of movement of a permanent magnet is shown as an X-axis direction, while a width direction orthogonal or substantially orthogonal thereto is shown as a Y-axis direction.

First Preferred Embodiment

Figure 1B:
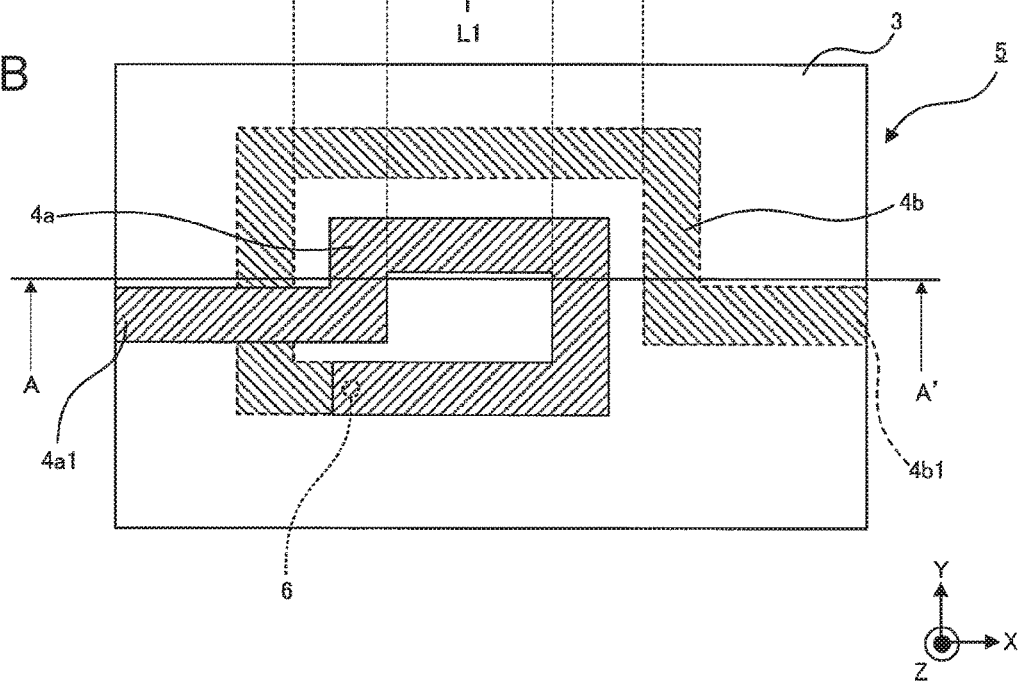

FIG. 1A is a side cross-sectional view schematically showing a structure of an actuator 1 according to a first preferred embodiment of the present invention, and FIG. 1B is a plane view schematically showing the actuator 1 of FIG. 1A. FIG. 1A shows a cross section taken along a line A-A' of FIG. 1B.

The actuator 1 of the present preferred embodiment includes a permanent magnet 2 and a coil board 5 including conductor patterns 4a, 4b provided on both surfaces of an insulating base material layer 3. The permanent magnet 2 is housed in a holder not shown and is moveable in a movement direction that is a direction of a double-headed arrow shown in FIG. 1A, i.e., in the X-axis direction. The permanent magnet 2 is spaced away from the coil board 5 in a direction of a coil axis L1 such that the polar direction thereof is perpendicular or substantially perpendicular to the coil axis L1 described later. The permanent magnet 2 is magnetized to include the N-pole on the negative direction side of the X-axis and the S-pole on the positive direction side of the X-axis relative to the coil axis L1 at the center in FIG. 1A.

For example, FR4 (Flame Retardant Type 4) is preferably used for the insulating base material layer 3. The conductor patterns 4a, 4b are preferably made of, for example, copper foil, and the conductor pattern 4a is provided on an upper surface 3a of the insulating base material layer 3 on the side facing the permanent magnet 2, while the conductor pattern 4b is provided on a lower surface 3b of the insulating base material layer 3 on the side opposite to the upper principal surface 3a. The insulating base material layer 3 and the conductor patterns 4a, 4b are provided with an interlayer connection conductor 6 (see FIG. 1B) penetrating the conductor pattern 4a on the upper surface 3a, the insulating base material 3, and the conductor pattern 4b on the lower surface 3b, and the interlayer connection conductor 6 electrically connects the conductor pattern 4a provided on the upper surface 3a and the conductor pattern 4b provided on the lower surface 3b. For example, a through-hole is preferably used as the interlayer connection conductor 6.

FIG. 1B shows a state in which the conductor pattern 4b is seen through in the direction from the top surface 3a. As shown in FIG. 1B, the conductor patterns 4a, 4b are wound about one turn on the upper surface 3a and about one turn on the lower surface 3b to define a rectangular or substantially rectangular coil. An end portion 4a1 of the conductor pattern 4a and an end portion 4b1 of the conductor pattern 4b are connected to a current supply source. As shown in FIG. 1A, the coil axis L1 of the coil including the conductor patterns 4a, 4b is in a direction perpendicular or substantially perpendicular to the top surface 3a of the insulating base material layer 3.

In the conductor pattern 4a defining and functioning as a closest conductor pattern disposed at the position closest to the permanent magnet 2 in the direction of the coil axis L1, an interval W1 inside the conductor pattern 4a in the polar direction of the permanent magnet 2 is preferably set smaller than an interval W2 inside the conductor pattern 4b that is the other conductor pattern. Since the number of turns of the conductor pattern 4a is about one, the interval W1 has a maximum width (first maximum width) of the interval inside the conductor pattern 4a in the polar direction of the permanent magnet 2. Similarly, since the number of turns of the conductor pattern 4b is about one, the interval W2 has a maximum width (second maximum width) of the interval inside the conductor pattern 4b in the polar direction of the permanent magnet 2.

Figure 2A:
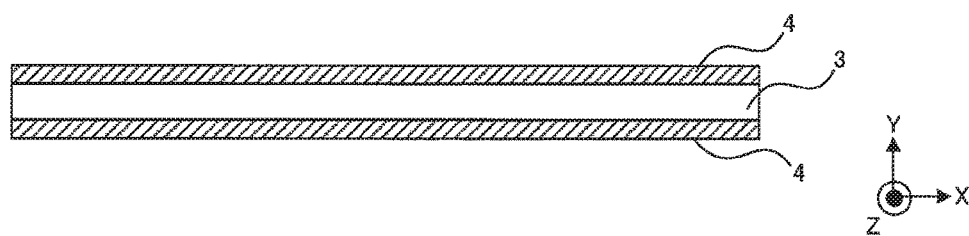
FIGS. 2A and 2B are views for explaining a manufacturing method of a coil board according to a preferred embodiment of the present invention.
Figure 2B:
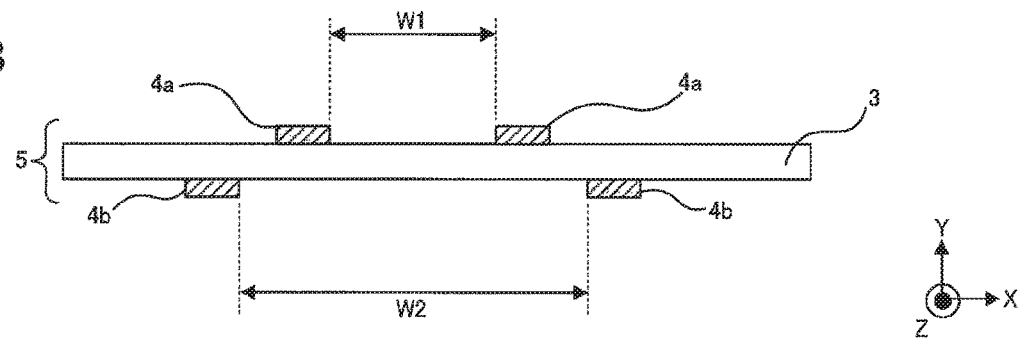

The coil board 5 of the present preferred embodiment may be formed by a non-limiting example of a manufacturing method as described below. FIGS. 2A and 2B are views for explaining a manufacturing method of the coil board 5 of the present preferred embodiment. First, as shown in FIG. 2A, a copper foil 4 is provided on both surfaces of the insulating base material 3 of FR4, and a hole is formed in the insulating base material 3 and the conductor patterns 4a, 4b by laser processing, punching processing, or other suitable method. Subsequently, as shown in FIG. 2B, conductor patterns 4a, 4b are formed by a patterning process, such as photolithography, for example. Electroless plating is performed at a portion at which the hole is formed, and electrolytic plating is then performed to form a through-hole for the interlayer connecting conductor 6. The conductor pattern 4a on the upper surface 3a and the conductor pattern 4b on the lower surface 3b are connected by the through-holes. In this manner, the coil board 5 is manufactured.

Figure 3:
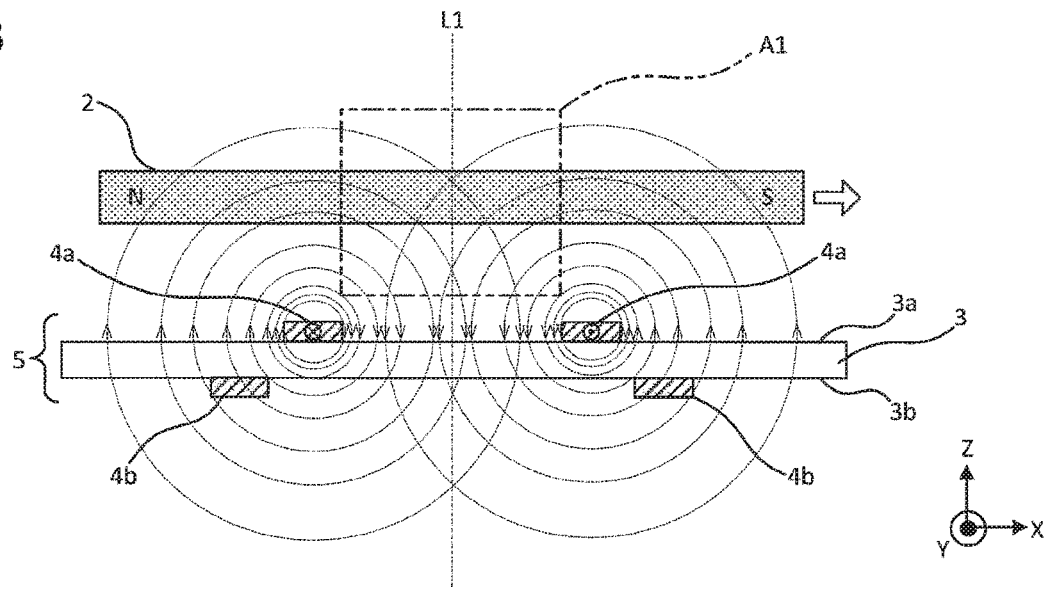
FIG. 3 is a view showing a relationship between a magnetic field of a conductor pattern and a permanent magnet when a current is supplied clockwise to a conductor pattern as viewed from a top surface of an insulating base material.
Figure 4:
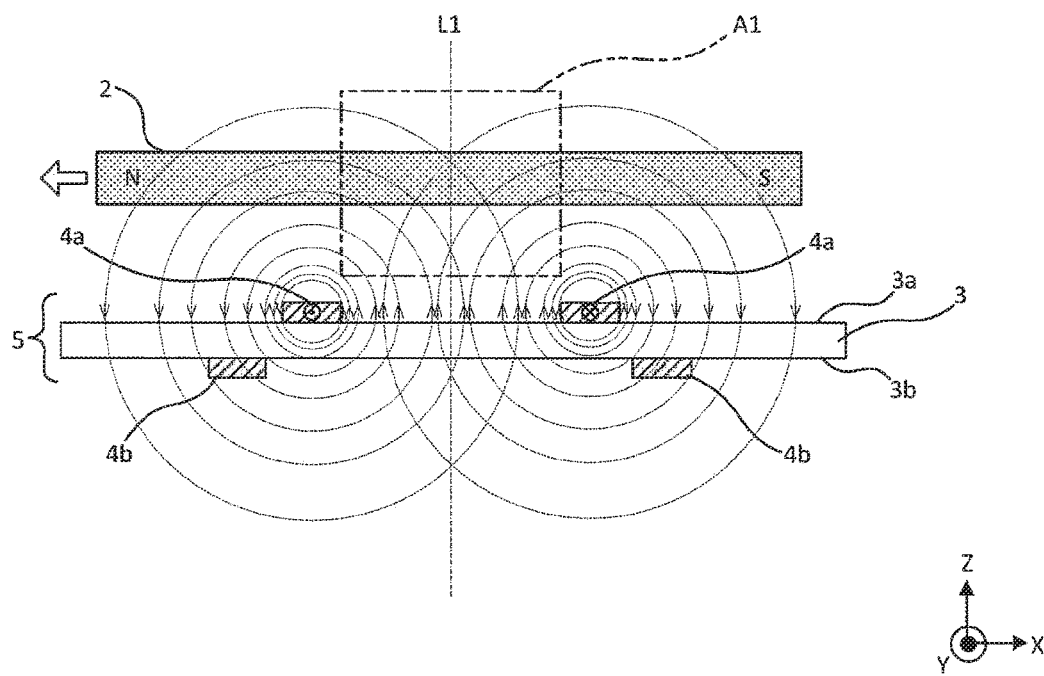
FIG. 4 is a view showing a relationship between the magnetic field of the conductor pattern and the permanent magnet when a current is supplied counterclockwise to the conductor pattern as viewed from the top surface of the insulating base material.

An operation of the actuator 1 of the present preferred embodiment will be described with reference to FIGS. 3 and 4. FIG. 3 is a view showing a relationship between a magnetic field of the conductor pattern 4a and the permanent magnet 2 when a current is supplied clockwise to the conductor pattern 4a as viewed from the top surface 3a of the insulating base material 3. FIG. 4 is a view showing a relationship between the magnetic field of the conductor pattern 4a and the permanent magnet 2 when a current is supplied counterclockwise to the conductor pattern 4a as viewed from the top surface of the insulating base material. In FIGS. 3 and 4, for simplicity of description, only the magnetic field of the conductor pattern 4a is schematically shown.

As shown in FIG. 3, when a current is supplied clockwise to the conductor pattern 4a as viewed from the upper surface 3a of the insulating base material 3, a magnetic field is generated in a direction from the upper surface 3a side to the lower surface 3b side in a space inside the conductor pattern 4a in the polar direction of the permanent magnet 2. The permanent magnet 2 receives a large electromagnetic force due to the magnetic field in a region A1 close to the inside of the conductor pattern 4a. The S-pole of the permanent magnet 2 repels the magnetic field, and the N-pole and the magnetic field attract each other. As a result, the permanent magnet 2 moves in a direction indicated by a white arrow of FIG. 3.

As shown in FIG. 4, when a current is supplied counterclockwise to the conductor pattern 4a as viewed from the upper surface 3a of the insulating base material 3, a magnetic field is generated in a direction from the lower surface 3b side to the upper surface 3a side in a space inside the conductor pattern 4a in the polar direction of the permanent magnet 2. In this case, the permanent magnet 2 receives a large electromagnetic force due to the magnetic field in the region A1 close to the inside of the conductor pattern 4a. The N-pole of the permanent magnet 2 repels the magnetic field, and the S-pole and the magnetic field attract each other. As a result, the permanent magnet 2 moves in a direction indicated by a white arrow of FIG. 4.

Figure 5A:
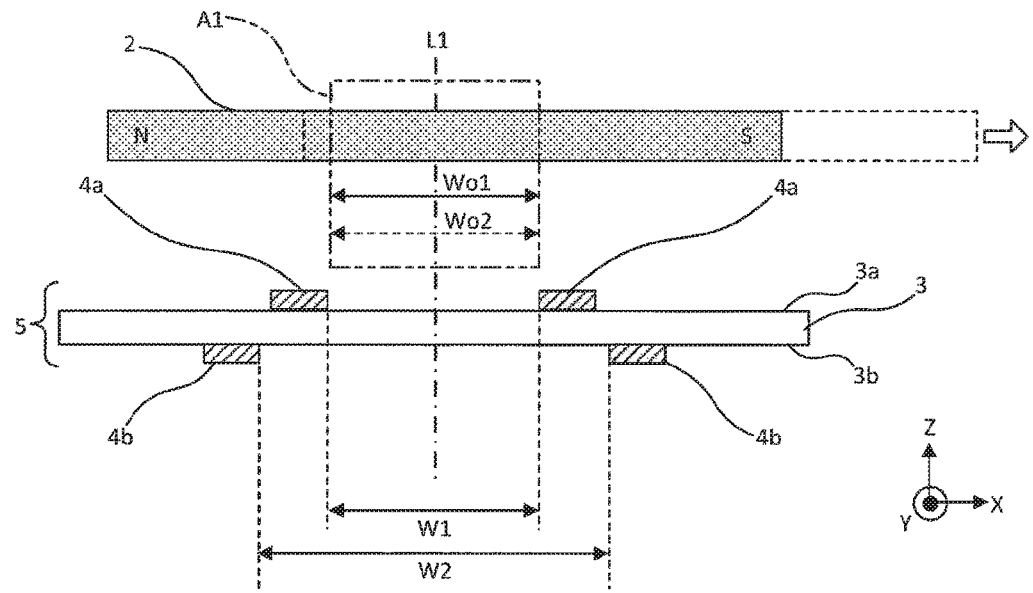
FIG. 5A is a view showing a relationship between an interval inside the conductor pattern and the permanent magnet of a preferred embodiment of the present invention and FIG. 5B is a view showing a relationship between an interval inside the conductor pattern and the permanent magnet a comparative example.
Figure 5B:
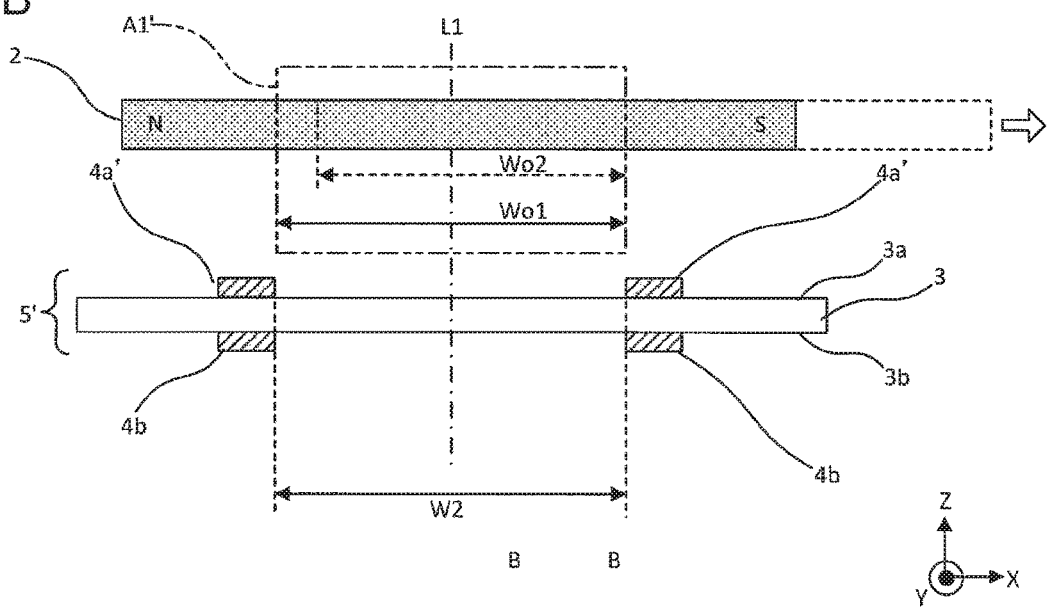

Description of the reason why the interval W1 inside the conductor pattern 4a in the polar direction of the permanent magnet 2 is preferably made smaller than the interval W2 of the conductor pattern 4b will be described. FIG. 5A is a view showing the relationship between the interval W1 inside the conductor pattern 4a and the permanent magnet 2 of the present preferred embodiment. FIG. 5B is a view showing as a comparative example of a relationship between the permanent magnet 2 and the interval W2 inside a conductor pattern 4a' in the polar direction of the permanent magnet 2. In FIG. 5B, the conductor pattern on the upper surface 3a of the insulating base material 3 is denoted by reference numeral 4a'. A region close to the inside of the conductor pattern 4a' is denoted by reference numeral A1'.

In the present preferred embodiment, since the interval W1 inside the conductor pattern 4a in the polar direction of the permanent magnet 2 is preferably made smaller than the interval W2 inside the conductor pattern 4b, the region A1 close to the inside of the conductor pattern 4a shown in FIG. 5B is smaller than the region A1' close to the inside of the conductor pattern 4a'.

Since the magnetic flux concentrates in the region A1, the permanent magnet 2 shown in FIG. 5A receives a large electromagnetic force due to the magnetic field in the region A1. Similarly, since the magnetic flux concentrates in the region A1', the permanent magnet 2 shown in FIG. 5B receives a large electromagnetic force due to the magnetic field in the region A1'.

Therefore, if an overlapping width changes between the region A1 or the region A1' and the permanent magnet 2 in the polar direction as viewed in the direction of the coil axis L1 (Z-axis direction), an amount of change in the electromagnetic force received by the permanent magnet 2 increases.

In the comparative example shown in FIG. 5B, when the permanent magnet 2 is at an initial position indicated by a solid line, an overlapping width Wo1 between the region A1' and the permanent magnet 2 in the polar direction as viewed in the direction of the coil axis L1 is equal or substantially equal to the interval W2 inside the conductor pattern 4a'. However, when the permanent magnet 2 moves to a position indicated by a dotted line, an N-pole end portion of the permanent magnet 2 is located inside the region A1' since the region A1' is large. As a result, an overlapping width Wo2 between the region A1' and the permanent magnet 2 in the polar direction as viewed in the direction of the coil axis L1 becomes smaller than the interval W2 inside the conductor pattern 4a'. Therefore, in the comparative example shown in FIG. 5B, the overlapping width between the region A1' and the permanent magnet 2 in the polar direction changes before and after the movement of the permanent magnet 2, so that the amount of change in the electromagnetic force received by the permanent magnet 2 increases.

In the present preferred embodiment shown in FIG. 5A, when the permanent magnet 2 is at an initial position indicated by a solid line, the overlapping width Wo1 between the region A1 and the permanent magnet 2 in the polar direction as viewed in the direction of the coil axis L1 is equal or substantially equal to the interval W1 inside the conductor pattern 4a. Even when the permanent magnet 2 moves to a position indicated by a dotted line, the N-pole end portion of the permanent magnet 2 is located outside the region A1 since the region A1 is small. As a result, the overlapping width Wo2 between the region A1 and the permanent magnet 2 in the polar direction as viewed in the direction of the coil axis L1 is equal or substantially equal to the overlapping width Wo1 at the initial position. Therefore, in the present preferred embodiment shown in FIG. 5A, the overlapping width between the region A1 and the permanent magnet 2 does not change before and after the movement of the permanent magnet 2, so that the amount of change in the electromagnetic force does not increase.

As described above, in the present preferred embodiment, in the conductor pattern 4a defining and functioning as the closest conductor pattern provided at the position closest to the permanent magnet 2 in the positional relationship in the direction of the coil axis L1, the interval W1 defined as the first maximum width inside the conductor pattern 4a in the polar direction of the permanent magnet 2 is preferably set to be smaller than the interval W2 defined as the second maximum width of the conductor pattern 4b. The interval W1 defined as the first maximum width inside the conductor pattern 4a and the overlapping widths Wo1, Wo2 in the polar direction of the permanent magnet 2 are the interval W1 defined as the first maximum width regardless of the position of the permanent magnet 2. Therefore, when the permanent magnet 2 moves in the polar direction, a change in electromagnetic force received from the coil including the conductor patterns 4a, 4b is able to be reduced so that the movement of the permanent magnet 2 is able to be more easily controlled.

However, if the interval W2 inside the conductor pattern 4b on the lower surface 3b is also reduced, the electromagnetic force is weakened, and therefore, in the present preferred embodiment, while the interval W1 inside the conductor pattern 4a on the upper surface 3a is reduced, the interval W2 inside the conductor pattern 4b of the lower surface 3b is accordingly increased to compensate for the reduction in the electromagnetic force.

In the present preferred embodiment, a rectangular or substantially rectangular coil including the conductor patterns 4a, 4b is described as an example. However, the present invention is not limited to such a configuration, and the shape of the coil may be a circular shape or an elliptical shape, for example.

In the present preferred embodiment, a configuration in which the numbers of turns of the conductor patterns 4a, 4b are about one is described as an example. However, the present invention is not limited to such a configuration, and the numbers of turns may be greater than about one. If the numbers of turns of the conductor patterns 4a, 4b are greater than about one and the numbers of turns are different from each other, the number of turns of the conductor pattern 4a at the position closest to the permanent magnet 2 in the direction of the coil axis L1 is preferably larger than the number of turns of the conductor pattern 4b.

In the present preferred embodiment, a configuration in which the conductor patterns 4a, 4b have equal or substantially equal line widths is described as an example. However, the present invention is not limited to such a configuration, and the line width of the conductor pattern 4a may be different from the line width of the conductor pattern 4b.

In the present preferred embodiment, a configuration in which a rigid base material, such as FR4, is used for the insulating base material layer 3 is described as an example. However, the present invention is not limited to such a configuration, and a flexible base material, such as a liquid crystal polymer, for example, may be used for the insulating base material layer 3.

In the present preferred embodiment, a configuration in which the coil board 5 is fixed while the permanent magnet 2 is movable is described as an example. However, the present invention is not limited to such a configuration and is applicable to the case in which the permanent magnet 2 is fixed while the coil board 5 is movable.

In the present preferred embodiment, a configuration in which the center of the permanent magnet 2 and the coil axis L1 coincide or substantially coincide with each other at the initial position of the permanent magnet 2 before a current is supplied to the conductor patterns 4a, 4b is described as an example. However, the present invention is not limited to such a configuration. For example, as indicated by the dotted line in FIG. 5A, even when the initial position of the permanent magnet 2 is a position at which the center of the permanent magnet 2 is shifted from the coil axis L1 and a current is supplied to the conductor patterns 4a, 4b from this state, the overlapping widths Wo1, Wo2 in the polar direction between the interval W1 inside the conductor pattern 4a and the permanent magnet 2 do not change before and after the movement of the permanent magnet 2 and are equal or substantially equal to the interval W1. As a result, the movement of the permanent magnet 2 is able to be easily controlled as described above.

Second Preferred Embodiment

Figure 6A:
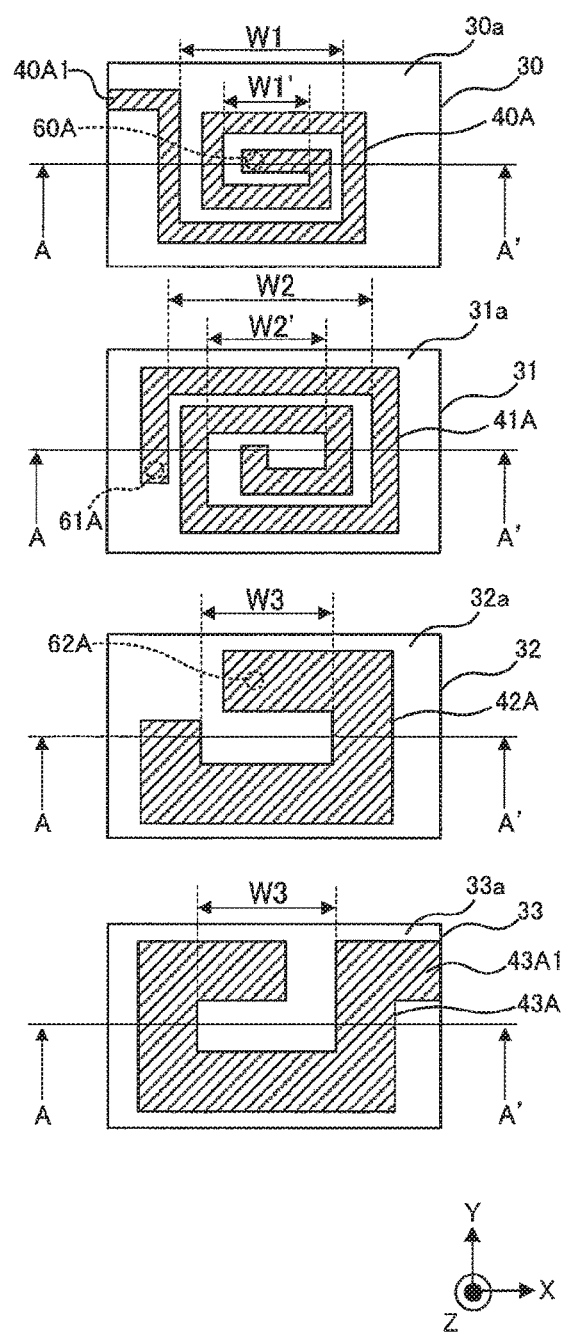
FIG. 6A is a plan view schematically showing insulating base material layers on each of which a conductor pattern is provided according to a second preferred embodiment of the present invention.
Figure 6B:
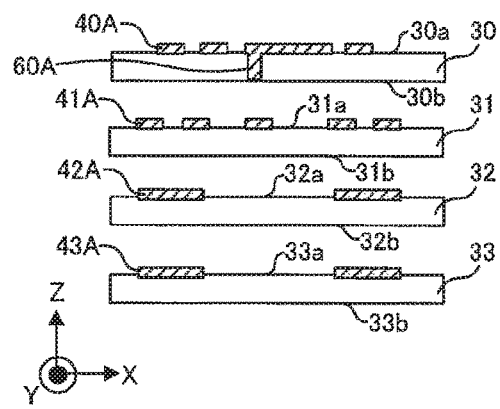
FIG. 6B is a view for explaining a manufacturing method of a coil board of the second preferred embodiment of the present invention.
Figure 6C:
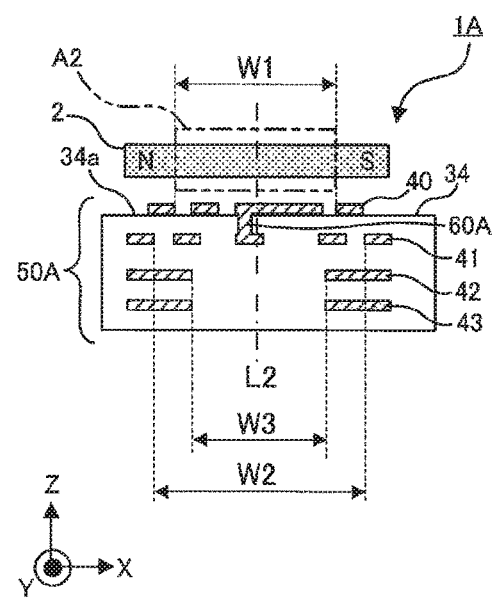
FIG. 6C is a side cross-sectional view schematically showing a structure of an actuator according to the second preferred embodiment of the present invention.

A second preferred embodiment of the present invention will be described with reference to the drawings. FIG. 6A is a plan view schematically showing insulating base material layers on each of which a conductor pattern is provided according to the present preferred embodiment. FIG. 6B is a view for explaining a manufacturing method of a coil board 50A of the present preferred embodiment. FIG. 6C is a side cross-sectional view schematically showing a structure of an actuator 1A according to the present preferred embodiment.

Unlike the first preferred embodiment, the actuator 1A of the present preferred embodiment includes a four-layer coil board 50A. FIG. 6A is a plan view schematically showing insulating base material layer on each of which a conductor pattern is provided. As shown in FIG. 6A, a conductor pattern 40A is provided on a first insulating base material layer 30, a conductor pattern 41A is provided on a second insulating base material layer 31, a conductor pattern 42A is provided on a third insulating base material layer 32, and a conductor pattern 43A is provided on a fourth insulating base material layer 33.

For the insulating base material layers 30, 31, 32, 33, for example, a thermoplastic resin, such as a liquid crystal polymer (LCP), is preferably used. The conductor patterns 40A, 41A, 42A, 43A are preferably copper foil patterns, for example, and are provided on the respective upper surfaces 30a, 31a, 32a, 33a of the insulating base material layers 30, 31, 32, 33. The insulating base material layer 30 is provided with an interlayer connection conductor 60A penetrating the insulating base material layer 30 from the upper surface 30a to a lower surface 30b (see FIG. 6B), so that the conductor pattern 40A provided on the insulating base material layer 30 is electrically connected to the conductor pattern 41A provided on the insulating base material layer 31.

Similarly, the insulating base material layer 31 is provided with an interlayer connection conductor 61A penetrating the insulating base material layer 31 from the upper surface 31a to a lower surface 31b (see FIG. 6B), so that the conductor pattern 41A provided on the insulating base material layer 31 is electrically connected to the conductor pattern 42A provided on the insulating base material layer 32. Similarly, the insulating base material layer 32 is provided with an interlayer connection conductor 62A penetrating the insulating base material layer 32 from the upper surface 32a to a lower surface 32b (see FIG. 6B), so that the conductor pattern 42A provided on the insulating base material layer 32 is electrically connected to the conductor pattern 43A provided on the insulating base material layer 33.

For the interlayer connection conductors 60A, 61A, 62A, for example, via conductors are preferably used. The via conductors are formed by filling via holes penetrating the insulating base material layers 30, 31, 32 with a conductive paste.

As shown in FIG. 6A, the conductor pattern 40A is wound about two turns on the upper surface 30a of the insulating base material layer 30. The conductor pattern 41A is wound about two turns on the upper surface 31a of the insulating base material layer 31. The conductor pattern 42A is wound about one turn on the upper surface 32a of the insulating base material layer 32. The conductor pattern 43A is wound about one turn on the upper surface 33a of the insulating base material layer 33. In the present preferred embodiment, the conductor patterns 40A, 41A, 42A, 43A wound in this manner and disposed over multiple layers are electrically connected by the interlayer connection conductors 60A, 61A, 62A to define a coil.

An end portion 40A1 of the first conductor pattern 40A and an end portion 43A1 of the fourth conductor pattern 43A are connected to a current supply source. As shown in FIG. 6C, a coil axis L2 of the coil including the conductor patterns 40A, 41A, 42A, 43A is in a direction perpendicular or substantially perpendicular to an upper surface 34a that is a principal surface of a laminated and integrated insulating base material substrate 34.

In the first conductor pattern 40A that is provided at the position closest to the permanent magnet 2 in the direction of the coil axis L2, the interval W1 inside the conductor pattern 40A in the polar direction of the permanent magnet 2 is preferably set to be smaller than the interval W2 inside the second conductor pattern 41A that is another conductor pattern. An interval W3 inside the third conductor pattern 42A and an interval W3 inside the fourth conductor pattern 43A are preferably set to be smaller than the interval W1 inside the first conductor pattern 40A.

In the present preferred embodiment, the first conductor pattern 40A is wound about two turns, and therefore, two types of intervals are provided inside the conductor pattern 40A in the polar direction (X-axis direction) of the permanent magnet 2 as the interval W1 on the outer side of the conductor pattern 40A and an interval W1' on the inner side of the conductor pattern 40A as shown in FIG. 6A.

Similarly, the second conductor pattern 41A is also wound about two turns, and therefore, two types of intervals are provided inside the conductor pattern 41A in the polar direction (X-axis direction) of the permanent magnet 2 as the interval W2 on the outer side of the conductor pattern 41A and an interval W2' on the inner side of the conductor pattern 41A as shown in FIG. 6A.

In the present preferred embodiment, the interval having the maximum width is used to define the interval inside the conductor pattern of each layer. In the first conductor pattern 40A defining and functioning as the closest conductor pattern, the interval W1 on the outer side of the conductor pattern 40A has the maximum width (first maximum width) of the interval inside the conductor pattern 40A, and in the second conductor pattern 41A, the interval W2 on the outer side of the conductor pattern 41A has the maximum width (second maximum width) of the interval inside the conductor pattern 41A. The interval having the maximum width is used in this manner since a line length of the outer side of the conductor pattern is longer than a line length of the inner side of the conductor pattern, and when a current is supplied to the conductor pattern, the magnetic field generated around the outer side of the conductor pattern has a larger strength and has a larger influence on the permanent magnet 2.

The coil board 50A of the present preferred embodiment may be formed by a non-limiting example of a manufacturing method as described below. FIG. 6B is a view for explaining the manufacturing method of the coil board 50A of the present preferred embodiment. FIG. 6C shows a cross section taken along a line A-A' of FIG. 6A.

First, the four insulating base material layers 30, 31, 32, 33 each including copper foil on one entire or substantially entire surface are prepared. For the insulating base material layers 30, 31, 32, 33, a thermoplastic resin, such as a liquid crystal polymer, for example, may be used as described above. The conductor patterns 40A, 41A, 42A, 43A are then formed by a patterning process of photolithography, for example. Via holes penetrating the insulating base materials 30, 31, 32 are then formed by laser processing, for example, from the lower surfaces 30b, 31b, 32b, 33b of the conductor patterns 40A, 41A, 42A, 43A on the side without the copper foil thereon. The via holes are filled with a conductive paste including a conductive material, such as Sn—Cu alloy, for example.

Subsequently, the insulating base material layers 30, 31, 32, 33 having the conductor patterns 40A, 41A, 42A, 43A formed thereon and the via holes filled with the conductive paste are laminated in the order shown in FIG. 6B and integrated by hot pressing, for example. At this point, the conductive paste filled in the via holes is also heated and cured to form the interlayer connection conductors 60A, 61A, 62A electrically connecting the conductor patterns of the insulating base material layers. In this manner, the coil board 50A is formed.

FIG. 6C is a side cross-sectional view schematically showing a structure of the actuator 1A according to the present preferred embodiment. The actuator 1A of the present preferred embodiment includes the permanent magnet 2 and the coil board 50A including the conductor patterns 40A, 41A, 42A, 43A and the interlayer connection conductors 60A, 61A, 62A provided in the insulating base material substrate 34 integrated by hot pressing as described above. As in the first preferred embodiment, the permanent magnet 2 is housed in a holder not shown and disposed movably in the X-axis direction shown in FIG. 6C. The permanent magnet 2 is spaced away from the coil board 50A in the direction of the coil axis L2 such that the polar direction thereof is perpendicular or substantially perpendicular to the coil axis L2. The permanent magnet 2 is magnetized to include the N-pole on the negative direction side of the X-axis and the S-pole on the positive direction side of the X-axis relative to the coil axis L2 at the center in FIG. 6C.

In the present preferred embodiment, the permanent magnet 2 is able to be moved in the polar direction of the permanent magnet 2 by supplying a current to the conductor patterns 40A, 41A, 42A, 43A according to the same or substantially the same principle as the principle described in the first preferred embodiment.

In the present preferred embodiment, in the first conductor pattern 40A defining and functioning as the closest conductor pattern disposed at the position closest to the permanent magnet 2 in the direction of the coil axis L2, the interval W1 inside the conductor pattern 40A in the polar direction of the permanent magnet 2 is preferably set to be smaller than the interval W2 inside the second conductor pattern 41A that is another conductor pattern. Therefore, a region A2 close to the inside of the conductor pattern 40A becomes smaller as compared to when the interval inside the conductor pattern 40A is preferably set to the interval W2. An overlapping width in the polar direction between the interval W1 defined as the first maximum width inside the conductor pattern 40A and the permanent magnet 2 is the interval W1 defined as the first maximum width regardless of the position of the permanent magnet 2. Therefore, when the permanent magnet 2 moves in the polar direction relative to the region A2, a change in the electromagnetic force received by the permanent magnet 2 from the magnetic field is reduced as in the first preferred embodiment, so that the movement of the permanent magnet 2 is able to be more easily controlled.

Also in the present preferred embodiment, if the interval W2 inside the second conductor pattern 41A is also reduced, the electromagnetic force is weakened, and therefore, while the interval W1 inside the first conductor pattern 40A is reduced, the interval W2 inside the second conductor pattern 41A is accordingly increased to compensate for the reduction in the electromagnetic force.

In the present preferred embodiment, the numbers of turns of the first conductor pattern 40A defining and functioning as the closest conductor pattern and the second conductor pattern 41A are set to be larger than the numbers of turns of the other conductor patterns, i.e., the third conductor pattern 42A and the fourth conductor pattern 43A. As a result, the electromagnetic force from the conductor patterns 40A, 41A on the side closer to the permanent magnet 2 is able to be increased, and the permanent magnet 2 is able to be reliably moved to a desired position.

In the present preferred embodiment, the first conductor pattern 40A defining and functioning as the closest conductor pattern and the second conductor pattern 41A have a line width narrower than the line width of turns of the other conductor patterns, i.e., the third conductor pattern 42A and the fourth conductor pattern 43A. In other words, in the present preferred embodiment, the third conductor pattern 42A and the fourth conductor pattern 43A on the side farther from the permanent magnet 2 in the direction of the coil axis L2 have a line width larger than the line widths of the other conductor patterns, i.e., the first conductor pattern 40A and the second conductor pattern 41A. As a result, the conductor resistance of the third conductor pattern 42A and the fourth conductor pattern 43A is able to be made lower so that a conductor loss in the coil is reduced.

As described above, as a result of making the line widths of the third conductor pattern 42A and the fourth conductor pattern 43A wider than the line widths of the first conductor pattern 40A and the second conductor pattern 41A, the interval W3 inside the third conductor pattern 42A and the interval W3 inside the fourth conductor pattern 43A are smaller than the interval W1 inside the first conductor pattern 40A. However, regarding the movement of the permanent magnet 2 in the polar direction, the relationship between the interval W1 inside the first conductor pattern 40A defining and functioning the closest conductor pattern and the interval W2 inside the second conductor pattern 41A satisfies W1<W2. The overlapping width in the polar direction between the interval W1 defined as the first maximum width inside the conductor pattern 40A and the permanent magnet 2 is the interval W1 defined as the first maximum width regardless of the position of the permanent magnet 2. Therefore, when the permanent magnet 2 moves in the polar direction as described above, a change in the electromagnetic force received from the magnetic field is reduced so that the movement of the permanent magnet 2 is able to be more easily controlled.

In the present preferred embodiment, a configuration in which the coil board 50A is a four layer board is described as an example. However, the present invention is not limited to such a configuration, and the number of laminated layers may be appropriately changed.

In the present preferred embodiment, a configuration in which the numbers of turns of the first conductor pattern 40A and the second conductor pattern 41A are about two is described as an example. However, the present invention is not limited to such a configuration, and the numbers of turns may be appropriately changed.

In the present preferred embodiment, a configuration in which a rectangular or substantially rectangular coil is provided of the conductor patterns 40A, 41A, 42A, 43A is described as an example. However, the present invention is not limited to such a configuration, and the shape of the coil may be a circular shape or an elliptical shape, for example.

In the present preferred embodiment, a configuration in which the line widths of the conductor patterns 40A, 41A are narrower than the line widths of the conductor patterns 42A, 43A is described as an example. However, the present invention is not limited to such a configuration, and the line widths of all of the conductor patterns may be made equal or substantially equal.

In the present preferred embodiment, a configuration in which a flexible base material, such as a liquid crystal polymer, is used for the insulating base material layers 30, 31, 32, 33 is described as an example. However, the present invention is not limited to such a configuration, and a rigid base material, such as FR4, for example, may be used for the insulating base material layers 30, 31, 32, 33.

In the present preferred embodiment, a configuration in which the coil board 50A is fixed while the permanent magnet 2 is movable is described as an example. However, the present invention is not limited to such a configuration and is applicable to the case in which the permanent magnet 2 is fixed while the coil board 50A is movable.

In the present preferred embodiment, a configuration in which the center of the permanent magnet 2 and the coil axis L2 coincide or substantially coincide with each other at the initial position of the permanent magnet 2 before a current is supplied to the conductor patterns 40A, 41A, 42A, 43A is described as an example. However, the present invention is not limited to such a configuration. For example, even when the initial position of the permanent magnet 2 is a position at which the center of the permanent magnet 2 is shifted from the coil axis L2 and a current is supplied to the conductor patterns 40A, 41A, 42A, 43A from this state, the overlapping width in the polar direction between the interval W1 inside the conductor pattern 40A and the permanent magnet 2 do not change before and after the movement of the permanent magnet 2 and is equal to the interval W1. As a result, the movement of the permanent magnet 2 is able to be easily controlled as described above.

Third Preferred Embodiment

A third preferred embodiment of the present invention will be described with reference to the drawings. FIG. 7A is a plan view schematically showing insulating base material layer on each of which a conductor pattern is provided according to the third preferred embodiment of the present invention. FIG. 7B is a view for explaining a non-limiting example of a manufacturing method of a coil board 50B of the present preferred embodiment. FIG. 7C is a side cross-sectional view schematically showing a structure of an actuator 1B according to the present preferred embodiment.

Unlike the second preferred embodiment, the actuator 1B of the present preferred embodiment includes intervals inside second to fourth conductor patterns set to the interval W2 and includes an interval inside a first conductor pattern set to the interval W1 smaller than the interval W2. FIG. 7A is a plan view schematically showing insulating base material layer on each of which a conductor pattern is provided. As shown in FIG. 7A, a conductor pattern 40B is provided on the first insulating base material layer 30, a conductor pattern 41B is provided on the second insulating base material layer 31, a conductor pattern 42B is provided on the third insulating base material layer 32, and a conductor pattern 43B is provided on the fourth insulating base material layer 33.

As in the second preferred embodiment, for example, a thermoplastic resin, such as a liquid crystal polymer, is preferably used for the insulating base material layers 30, 31, 32, 33. As in the second preferred embodiment, the conductor patterns 40B, 41B, 42B, 43B are preferably copper foil patterns, for example, and are provided on the respective upper surfaces 30a, 31a, 32a, 33a of the insulating base material layers 30, 31, 32, 33. The insulating base material layer 30 is provided with an interlayer connection conductor 60B penetrating the insulating base material layer 30 from the upper surface 30a to the lower surface 30b (see FIG. 7B), so that the conductor pattern 40B provided on the insulating base material layer 30 is electrically connected to the conductor pattern 41B provided on the insulating base material layer 31.

Similarly, the insulating base material layer 31 is provided with an interlayer connection conductor 61B penetrating the insulating base material layer 31 from the upper surface 31a to the lower surface 31b (see FIG. 7B), so that the conductor pattern 41B provided on the insulating base material layer 31 is electrically connected to the conductor pattern 42B provided on the insulating base material layer 32. Similarly, the insulating base material layer 32 is provided with an interlayer connection conductor 62B penetrating the insulating base material layer 32 from the upper surface 32a to the lower surface 32b (see FIG. 7B), so that the conductor pattern 42B provided on the insulating base material layer 32 is electrically connected to the conductor pattern 43B provided on the insulating base material layer 33.

As in the second preferred embodiment, for example, via conductors are preferably used for the interlayer connection conductors 60B, 61B, 62B. The via conductors are formed by filling via holes penetrating the insulating base materials 30, 31, 32 with a conductive paste.

As shown in FIG. 7A, the conductor pattern 40B is wound about two turns on the upper surface 30a of the insulating base material layer 30. The conductor pattern 41B is wound about two turns on the upper surface 31a of the insulating base material layer 31. The conductor pattern 42B is wound about two turns on the upper surface 32a of the insulating base material layer 32. The conductor pattern 43B is wound about two turns on the upper surface 33a of the insulating base material layer 33. In the present preferred embodiment, the conductor patterns 40B, 41B, 42B, 43B wound in this manner and disposed over multiple layers are electrically connected by the interlayer connection conductors 60B, 61B, 62B to define a coil.

An end portion 40B1 of the first conductor pattern 40B and an end portion 43B1 of the fourth conductor pattern 43B are connected to a current supply source. As shown in FIG. 7C, a coil axis L3 of the coil including the conductor patterns 40B, 41B, 42B, 43B is in a direction perpendicular or substantially perpendicular to the upper surface 34a of the laminated and integrated insulating base material substrate 34.

In the first conductor pattern 40B that is the closest conductor pattern provided at the position closest to the permanent magnet 2 in the direction of the coil axis L3, the interval W1 inside the conductor pattern 40B in the polar direction of the permanent magnet 2 is preferably set to be smaller than the intervals W2 inside the second conductor pattern 41B, the third conductor pattern 42B, and the fourth conductor pattern 43B that are the other conductor patterns.

In the present preferred embodiment, the first conductor pattern 40B is wound about two turns, and therefore, two types of intervals are provided inside the conductor pattern 40B in the polar direction (X-axis direction) of the permanent magnet 2 as the interval W1 on the outer side of the conductor pattern 40B and the interval W1' on the inner side of the conductor pattern 40B as shown in FIG. 7A.

Similarly, the second conductor pattern 41B, the third conductor pattern 42B, and the fourth conductor pattern 43B are also wound about two turn, and therefore, two types of intervals are provided inside each of the conductor pattern 41B, the conductor pattern 42B, and the conductor pattern 43B in the polar direction (X-axis direction) of the permanent magnet 2 as the interval W2 of the conductor pattern 41B, the conductor pattern 42B, and the conductor pattern 43B on the outer side and the interval W2' of the conductor pattern 41B, the conductor pattern 42B, and the conductor pattern 43B on the inner side as shown in FIG. 7A.

In the present preferred embodiment, the interval having the maximum width is used to define the interval inside the conductor pattern of each layer. In the first conductor pattern 40B, the interval W1 on the outer side of the conductor pattern 40B has the maximum width (first maximum width) of the interval inside the conductor pattern 40B, and in the second conductor pattern 41B, the third conductor pattern 42B, and the fourth conductor pattern 43B, the interval W2 on the outer side of the second conductor pattern 41B, the third conductor pattern 42B, and the fourth conductor pattern 43B has the maximum width (second maximum width) of the intervals inside the second conductor pattern 41B, the third conductor pattern 42B, and the fourth conductor pattern 43B. The interval having the maximum width is used in this manner since a line length of the outer side of the conductor pattern is longer than a line length of the inner side of the conductor pattern, and when a current is supplied to the conductor pattern, the magnetic field generated around the outer side of the conductor pattern has a larger strength and has a larger influence on the permanent magnet 2.

The coil board 50B of the present preferred embodiment may be formed by a manufacturing method as described below. FIG. 7B is a view for explaining a non-limiting example of a manufacturing method of the coil board 50B of the present preferred embodiment. FIG. 7C shows a cross section taken along a line A-A' of FIG. 7A.

First, the four insulating base material layers 30, 31, 32, 33 each including copper foil on one entire or substantially entire surface are prepared. For the insulating base material layers 30, 31, 32, 33, a thermoplastic resin, such as a liquid crystal polymer, may be used as described above. The conductor patterns 40B, 41B, 42B, 43B are then formed by a patterning process of photolithography, for example. Via holes penetrating the insulating base materials 30, 31, 32 are then formed by laser processing, for example, from the lower surfaces 30b, 31b, 32b, 33b of the conductor patterns 40B, 41B, 42B, 43B on the side without the copper foil attached thereto. The via holes are filled with a conductive paste including a conductive material, such as Sn—Cu alloy, for example.

Subsequently, the insulating base material layers 30, 31, 32, 33 including the conductor patterns 40B, 41B, 42B, 43B formed thereon and the via holes filled with the conductive paste are laminated in the order shown in FIG. 7B and integrated by hot pressing, for example. At this point, the conductive paste filled in the via holes is also heated and cured to form the interlayer connection conductors 60B, 61B, 62B electrically connecting the conductor patterns of the insulating base materials. In this manner, the coil board 50B is formed.

FIG. 7C is a side cross-sectional view schematically showing a structure of the actuator 1B according to the present preferred embodiment. The actuator 1B of the present preferred embodiment includes the permanent magnet 2 and the coil board 50B with the conductor patterns 40B, 41B, 42B, 43B and the interlayer connection conductors 60B, 61B, 62B formed in the insulating base material substrate 34 integrated by hot pressing as described above. As in the first and second preferred embodiments, the permanent magnet 2 is housed in a holder not shown and disposed movably in the X-axis direction shown in FIG. 7C. The permanent magnet 2 is spaced away from the coil board 50B in the direction of the coil axis L3 such that the polar direction thereof is perpendicular or substantially perpendicular to the coil axis L3. The permanent magnet 2 is magnetized to include the N-pole on the negative direction side of the X-axis and the S-pole on the positive direction side of the X-axis relative to the coil axis L3 at the center in FIG. 7C.

In the present preferred embodiment, the permanent magnet 2 is able to be moved in the polar direction of the permanent magnet 2 by supplying a current to the conductor patterns 40B, 41B, 42B, 43B according to the same or substantially the same principle as the principle described in the first preferred embodiment.

In the present preferred embodiment, in the first conductor pattern 40B defining and functioning as the closest conductor pattern, the interval W1 inside the conductor pattern 40B in the polar direction of the permanent magnet 2 is preferably set to be smaller than the intervals W2 inside the second to fourth conductor patterns 41B, 42B, and 43B that are the other conductor patterns. Therefore, a region A3 close to the inside of the conductor pattern 40B becomes smaller as compared to when the interval inside the conductor pattern 40B is preferably set to the interval W2. An overlapping width in the polar direction between the interval W1 defined as the first maximum width inside the conductor pattern 40B and the permanent magnet 2 is the interval W1 defined as the first maximum width regardless of the position of the permanent magnet 2. As a result, when the permanent magnet 2 moves in the polar direction relative to the region A3, a change in the electromagnetic force received by the permanent magnet 2 from the magnetic field is reduced as in the first preferred embodiment, so that the movement of the permanent magnet 2 is able to be more easily controlled.

Also in the present preferred embodiment, if the intervals W2 inside the second to fourth conductor patterns 41B, 42B, and 42B are also reduced, the electromagnetic force is weakened, and therefore, while the interval W1 inside the first conductor pattern 40B is reduced, the intervals W2 inside the second conductor pattern 41B, the third conductor pattern 42B, and the fourth conductor pattern 43B are accordingly increased to compensate for the reduction in the electromagnetic force.

As described above, according to the present preferred embodiment, the conductor pattern 40B defining and functioning as the closest conductor pattern has the maximum width of the interval inside the conductor pattern 40B in the polar direction of the permanent magnet 2 smaller than the maximum widths of the intervals inside the other conductor patterns 41B, 42B, and 43B. The overlapping width in the polar direction between the interval W1 defined as the first maximum width inside the conductor pattern 40B and the permanent magnet 2 is the interval W1 defined as the first maximum width regardless of the position of the permanent magnet 2. Therefore, when the permanent magnet 2 moves in the polar direction, a change in the electromagnetic force received by the permanent magnet 2 from the magnetic field is able to be reduced so that the movement of the permanent magnet 2 is able to be more easily controlled.

In the present preferred embodiment, a configuration in which the coil board 50B is a four layer board is described as an example. However, the present invention is not limited to such a configuration, and the number of laminated layers may be appropriately changed.

In the present preferred embodiment, a configuration in which the numbers of turns of the conductor patterns of the layers are about two is described as an example. However, the present invention is not limited to such a configuration, and the numbers of turns may be appropriately changed. However, the number of turns of the conductor pattern on the side closer to the permanent magnet 2 in the direction of the coil axis L3 is preferably larger than the numbers of turns of the other conductor patterns.

In the present preferred embodiment, a configuration in which a rectangular or substantially rectangular coil is defined by the conductor patterns 40B, 41B, 42B, 43B is described as an example. However, the present invention is not limited to such a configuration, and the shape of the coil may be a circular shape or an elliptical shape, for example.

In the present preferred embodiment, a configuration in which the conductor patterns of the respective layers have equal or substantially equal line widths is described as an example. However, the present invention is not limited to such a configuration, and the conductor pattern on the side closer to the permanent magnet 2 in the direction of the coil axis L3 may have a line width narrower than the line widths of the other conductor patterns.

In the present preferred embodiment, a configuration in which a flexible base material, such as a liquid crystal polymer, is used for the insulating base material layers 30, 31, 32, 33 is described as an example. However, the present invention is not limited to such a configuration, and a rigid base material, such as FR4, for example, may be used for the insulating base materials 30, 31, 32, 33.

In the present preferred embodiment, a configuration in which the coil board 50B is fixed while the permanent magnet 2 is movable is described as an example. However, the present invention is not limited to such a configuration and is applicable to the case in which the permanent magnet 2 is fixed while the coil board 50B is movable.

In the present preferred embodiment, a configuration in which the center of the permanent magnet 2 and the coil axis L3 coincide or substantially coincide with each other at the initial position of the permanent magnet 2 before a current is supplied to the conductor patterns 40B, 41B, 42B, 43B is described as an example. However, the present invention is not limited to such a configuration. For example, even when the initial position of the permanent magnet 2 is a position at which the center of the permanent magnet 2 is shifted from the coil axis L3 and a current is supplied to the conductor patterns 40B, 41B, 42B, 43B from this state, the overlapping width in the polar direction between the interval W1 inside the conductor pattern 40B and the permanent magnet 2 do not change before and after the movement of the permanent magnet 2 and is equal to the interval W1. As a result, the movement of the permanent magnet 2 is able to be easily controlled as described above.

Fourth Preferred Embodiment

A fourth preferred embodiment of the present invention will be described with reference to the drawings. FIG. 8A is a plan view schematically showing an insulating base material layer on each of which a conductor pattern is provided according to the fourth preferred embodiment of the present invention. FIG. 8B is a view for explaining a non-limiting example of a manufacturing method of a coil board 50C of the present preferred embodiment. FIG. 8C is a side cross-sectional view schematically showing a structure of an actuator 10 according to the present preferred embodiment.

Unlike the third preferred embodiment, the actuator 1C of the present preferred embodiment includes intervals inside the conductor patterns preferably set to be larger in the conductor pattern at a position farther from the permanent magnet 2 in a direction of a coil axis L4. FIG. 8A is a plan view schematically showing insulating base material layer on each of which a conductor pattern is provided. As shown in FIG. 8A, a conductor pattern 40C is provided on the first insulating base material layer 30, a conductor pattern 41C is provided on the second insulating base material layer 31, a conductor pattern 42C is provided on the third insulating base material layer 32, and a conductor pattern 43C is provided on the fourth insulating base material layer 33.

As in the first to third preferred embodiments, for example, a thermoplastic resin, such as a liquid crystal polymer, is preferably used for the insulating base material layers 30, 31, 32, 33. As in the first to third preferred embodiments, the conductor patterns 40C, 41C, 42C, 43C are preferably copper foil patterns, for example, and are provided on the respective upper surfaces 30a, 31a, 32a, 33a of the insulating base material layers 30, 31, 32, 33. The insulating base material layer 30 is provided with an interlayer connection conductor 60C penetrating the insulating base material layer 30 from the upper surface 30a to the lower surface 30b (see FIG. 8B), so that the conductor pattern 40C provided on the insulating base material layer 30 is electrically connected to the conductor pattern 41C provided on the insulating base material layer 31.

Similarly, the insulating base material layer 31 is provided with an interlayer connection conductor 61C penetrating the insulating base material layer 31 from the upper surface 31a to the lower surface 31b (see FIG. 8B), so that the conductor pattern 41C provided on the insulating base material layer 31 is electrically connected to the conductor pattern 42C provided on the insulating base material layer 32. Similarly, the insulating base material layer 32 is provided with an interlayer connection conductor 62C penetrating the insulating base material layer 32 from the upper surface 32a to the lower surface 32b (see FIG. 8B), so that the conductor pattern 42C provided on the insulating base material layer 32 is electrically connected to the conductor pattern 43C provided on the insulating base material layer 33.

As in the second and third preferred embodiments, for example, via conductors are preferably used for the interlayer connection conductors 60C, 61C, 62C. The via conductors are formed preferably by filling via holes penetrating the insulating base materials 30, 31, 32 with a conductive paste.

As shown in FIG. 8A, the conductor pattern 40C is wound about two turns on the upper surface 30a of the insulating base material layer 30. The conductor pattern 41C is wound about two turns on the upper surface 31a of the insulating base material layer 31. The conductor pattern 42C is wound about two turns on the upper surface 32a of the insulating base material layer 32. The conductor pattern 43C has an L-shape on the upper surface 33a of the insulating base material layer 33. In the present preferred embodiment, the conductor patterns 40C, 41C, 42C, 43C wound in this manner and disposed over multiple layers are electrically connected by the interlayer connection conductors 60C, 61C, 62C to define a coil.

An end portion 40C1 of the first conductor pattern 40C and an end portion 43C1 of the fourth conductor pattern 43C are connected to a current supply source. As shown in FIG. 8C, the coil axis L4 of the coil including the conductor patterns 40C, 41C, 42C, 43C is in a direction perpendicular or substantially perpendicular to the upper surface 34a that is a principal surface of the laminated and integrated insulating base material substrate 34.

In the first conductor pattern 40C that is the closest conductor pattern provided at the position closest to the permanent magnet 2 in the direction of the coil axis L4, the interval W1 inside the conductor pattern 40C in the polar direction of the permanent magnet 2 is preferably set to be smaller than the interval W2 and the interval W3 inside the second conductor pattern 41C and the third conductor pattern 42C, respectively, that are other conductor patterns.

In the present preferred embodiment, the first conductor pattern 40C is wound about two turns, and therefore, two types of intervals are provided inside the conductor pattern 40C in the polar direction (X-axis direction) of the permanent magnet 2 as the interval W1 on the outer side of the conductor pattern 40C and the interval W1' on the inner side of the conductor pattern 40C as shown in FIG. 8A.

Similarly, the second conductor pattern 41C and the third conductor pattern 42C are also wound about two turns, and therefore, two types of intervals are provided inside each of the conductor pattern 41C and the conductor pattern 42C in the polar direction (X-axis direction) of the permanent magnet 2 as the interval W2 of the conductor pattern 41C and the interval W3 of the conductor pattern 42C on the outer side as well as the interval W2' of the conductor pattern 41C and the interval W3' of the conductor pattern 42C on the inner side as shown in FIG. 8A.

In the present preferred embodiment, the interval having the maximum width is used to define the interval inside the conductor pattern of each layer. In the first conductor pattern 40C, the interval W1 on the outer side of the conductor pattern 40C has the maximum width of the interval inside the conductor pattern 40C, and in the second conductor pattern 41C and the third conductor pattern 42C, the interval W2 on the outer side of the conductor pattern 41C and the interval W3 on the outer side of the conductor pattern 42C have the maximum widths of the intervals inside the conductor pattern 41C and the conductor pattern 42C. The interval having the maximum width is used in this manner since a line length of the outer side of the conductor pattern is longer than a line length of the inner side of the conductor pattern, and when a current is supplied to the conductor pattern, the magnetic field generated around the outer side of the conductor pattern has a larger strength and has a larger influence on the permanent magnet 2.

The coil board 50C of the present preferred embodiment may be formed by a non-limiting example of a manufacturing method as described below. FIG. 8B is a view for explaining the manufacturing method of the coil board 50C of the present preferred embodiment. FIG. 8B shows a cross section taken along a line A-A' of FIG. 8A.

First, the four insulating base material layers 30, 31, 32, 33 each including copper foil attached to one entire or substantially entire surface are prepared. For the insulating base material layers 30, 31, 32, 33, a thermoplastic resin, such as a liquid crystal polymer, may be used as described above. The conductor patterns 40C, 41C, 42C, 43C are then formed by a patterning process of photolithography, for example. Via holes penetrating the insulating base material layers 30, 31, 32 are then formed by laser processing, for example, from the lower surfaces 30b, 31b, 32b, 33b of the conductor patterns 40C, 41C, 42C, 43C on the side without the copper foil attached thereto. The via holes are filled with a conductive paste including a conductive material, such as Sn—Cu alloy, for example.

Subsequently, the insulating base material layers 30, 31, 32, 33 including the conductor patterns 40C, 41C, 42C, 43C formed thereon and the via holes filled with the conductive paste are laminated in the order shown in FIG. 8B and integrated by hot pressing, for example. At this point, the conductive paste filled in the via holes is also heated and cured to form the interlayer connection conductors 60C, 61C, 62C electrically connecting the conductor patterns of the insulating base material layers. In this manner, the coil board 50C is formed.

FIG. 8C is a side cross-sectional view schematically showing a structure of the actuator 1C according to the present preferred embodiment. The actuator 1C of the present preferred embodiment includes the permanent magnet 2 and the coil board 50C with the conductor patterns 40C, 41C, 42C, 43C and the interlayer connection conductors 60C, 61C, 62C provided in the insulating base material layer 34 integrated by hot pressing, for example, as described above. As in the first to third preferred embodiments, the permanent magnet 2 is housed in a holder not shown and disposed movably in the X-axis direction shown in FIG. 8C. The permanent magnet 2 is spaced away from the coil board 50C in the direction of the coil axis L4 such that the polar direction thereof is perpendicular or substantially perpendicular to the coil axis L4. The permanent magnet 2 is magnetized to include the N-pole on the negative direction side of the X-axis and the S-pole on the positive direction side of the X-axis relative to the coil axis L4 at the center in FIG. 8C.

In the present preferred embodiment, the permanent magnet 2 is able to be moved in the polar direction of the permanent magnet 2 by supplying a current to the conductor patterns 40C, 41C, 42C, 43C in the same or substantially the same manner as described in the first preferred embodiment.

In the present preferred embodiment, in the first-layer conductor pattern 40B defining and functioning as the closest conductor pattern, the interval W1 inside the conductor pattern 40C in the polar direction of the permanent magnet 2 is preferably set to be smaller than the interval W2 and the interval W3 inside the second-layer conductor pattern 41C and the third-layer conductor pattern 42C, respectively, that are other conductor patterns. Specifically, the interval is larger in the conductor pattern at a position farther from the permanent magnet 2 in the direction of a coil axis L4, so that the interval W1 inside the conductor pattern 40C is the smallest. Therefore, a region A4 close to the inside of the conductor pattern 40C becomes smaller as compared to when the interval inside the conductor pattern 40C is preferably set to the interval W2 or the interval W3. An overlapping width in the polar direction between the interval W1 defined as the first maximum width inside the conductor pattern 40C and the permanent magnet 2 is the interval W1 defined as the first maximum width regardless of the position of the permanent magnet 2. As a result, when the permanent magnet 2 moves in the polar direction relative to the region A4, a change in the electromagnetic force received by the permanent magnet 2 from the magnetic field is reduced as in the first preferred embodiment, so that the movement of the permanent magnet 2 is able to be more easily controlled.

Also in the present preferred embodiment, if the interval W2 inside the second-conductor pattern 41C and the interval W3 inside the third-conductor pattern 42C are reduced like the interval W1 inside the first-conductor pattern 40C, the electromagnetic force is weakened. Therefore, while the interval W1 inside the first-layer conductor pattern 40C is reduced, the intervals W2 inside the second-layer conductor pattern 41C and the interval W3 inside the third-conductor pattern 42C are accordingly made larger than the interval W1 inside the first-conductor pattern 40C to compensate for the reduction in the electromagnetic force.

As described above, according to the present preferred embodiment, the conductor pattern 40C disposed at the position closest to the permanent magnet 2 has the maximum width of the interval inside the conductor pattern 40C in the polar direction of the permanent magnet 2 that is smaller than the maximum widths of the intervals inside the other conductor patterns 41C and 42C. The overlapping width in the polar direction between the interval W1 defined as the first maximum width inside the conductor pattern 40C and the permanent magnet 2 is the interval W1 defined as the first maximum width regardless of the position of the permanent magnet 2. Therefore, when the permanent magnet 2 moves in the polar direction, a change in the electromagnetic force received by the permanent magnet 2 from the magnetic field is able to be reduced so that the movement of the permanent magnet 2 is able to be more easily controlled.

In the present preferred embodiment, a configuration in which the coil board 50C is a four-layer board is described as an example. However, the present invention is not limited to such a configuration, and the number of laminated layers may be appropriately changed.

In the present preferred embodiment, a configuration in which the numbers of turns of the first-layer to third-layer conductor patterns are about two is described as an example. However, the present invention is not limited to such a configuration, and the numbers of turns may be appropriately changed. However, the number of turns of the conductor pattern on the side closer to the permanent magnet 2 in the direction of the coil axis L4 is preferably larger than the numbers of turns of the other conductor patterns.

In the present preferred embodiment, a configuration in which a rectangular or substantially rectangular coil is defined by the conductor patterns 40C, 41C, 42C, 43C is described as an example. However, the present invention is not limited to such a configuration, and the shape of the coil may be a circular shape or an elliptical shape, for example.

In the present preferred embodiment, a configuration in which the conductor patterns of the layers have equal or substantially equal line widths is described as an example. However, the present invention is not limited to such a configuration, and the conductor pattern on the side closer to the permanent magnet 2 in the direction of the coil axis L4 may have a line width narrower than the line widths of the other conductor patterns.

In the present preferred embodiment, a configuration in which a flexible base material, such as a liquid crystal polymer, is used for the insulating base material layers 30, 31, 32, 33 is described as an example. However, the present invention is not limited to such a configuration, and a rigid base material, such as FR4, for example, may be used for the insulating base material layers 30, 31, 32, 33.

In the present preferred embodiment, a configuration in which the coil board 50C is fixed while the permanent magnet 2 is movable is described as an example. However, the present invention is not limited to such a configuration and is applicable to the case in which the permanent magnet 2 is fixed while the coil board 50C is movable.

In the present preferred embodiment, a configuration in which the center of the permanent magnet 2 and the coil axis L4 coincide or substantially coincide with each other at the initial position of the permanent magnet 2 before a current is supplied to the conductor patterns 40C, 41C, 42C, 43C is described. However, the present invention is not limited to such a configuration. For example, even when the initial position of the permanent magnet 2 is a position at which the center of the permanent magnet 2 is shifted from the coil axis L4 and a current is supplied to the conductor patterns 40C, 41C, 42C, 43C from this state, the overlapping width in the polar direction between the interval W1 inside the conductor pattern 40C and the permanent magnet 2 do not change before and after the movement of the permanent magnet 2 and is equal or substantially equal to the interval W1. The movement of the permanent magnet 2 is able to be easily controlled as described above.

Figure 9:
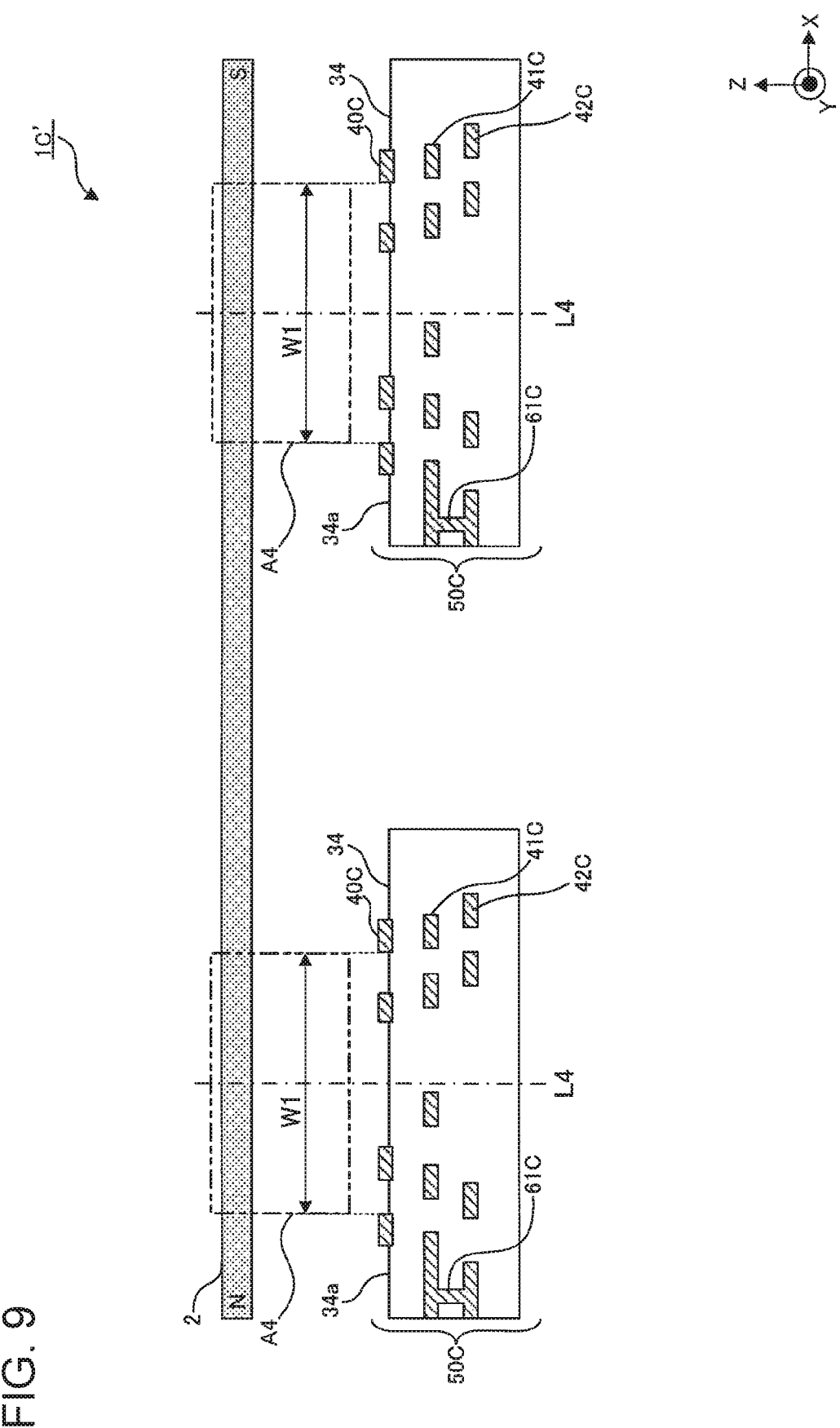
FIG. 9 is a side cross-sectional view schematically showing a structure of an actuator according to a modification of the fourth preferred embodiment of the present invention.

FIG. 9 is a side cross-sectional view schematically showing a structure of an actuator 1C' according to a modification of the fourth preferred embodiment of the present invention. In the modification shown in FIG. 9, the two coil boards 50C of the fourth preferred embodiment are included for the one permanent magnet 2. Even in such a configuration, the same or substantially advantageous effects as those of the fourth preferred embodiment are able to be produced.

Similarly, any of the coil boards 5, 50A, 50B described in the first to third preferred embodiments may be included as two coil boards for the one permanent magnet 2. Even in such a configuration, the same or substantially the same advantageous effects as those of the fourth preferred embodiment are able to be produced.

The above description of the preferred embodiments is illustrative in all respects and is not restrictive. Variations and modifications may be made as appropriate by those skilled in the art. The scope of the present invention is defined by the scope of claims rather than the preferred embodiments described above. Furthermore, the scope of the present invention includes modifications from the preferred embodiments within the scope equivalent to the scope of claims.

Preferred embodiments of the present invention and modifications thereof have applicability in the field of actuators including electromagnets, for example.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. An actuator that moves a permanent magnet, the actuator comprising:
   a coil providing a magnetic field to move the permanent magnet in a movement direction perpendicular or substantially perpendicular to a coil axis of the coil; wherein
   the coil includes conductor patterns provided in a plurality of layers on at least one insulating base material layer and including the coil axis in a direction perpendicular or substantially perpendicular to a principal surface of the at least one insulating base material layer;
   the permanent magnet is disposed above the principal surface of the at least one insulating base material layer in a direction of the coil axis so that a polar direction of the permanent magnet is the movement direction;
   the conductor patterns include a closest conductor pattern provided at a position closest to the permanent magnet in the direction of the coil axis;
   a first maximum width is a maximum width of an interval inside the closest conductor pattern in the polar direction and is smaller than a second maximum width of an interval inside at least one other conductor pattern in the polar direction; and
   an overlapping width in the polar direction between the interval of the first maximum width inside the closest conductor pattern and the permanent magnet is the first maximum width regardless of a position of the permanent magnet.

2. The actuator according to claim 1, wherein the first maximum width of the interval inside the closest conductor pattern in the polar direction is smaller than the second maximum width of the interval inside the at least one other conductor pattern in the polar direction.

3. The actuator according to claim 1, wherein maximum widths of the intervals inside the conductor patterns in the polar direction of the permanent magnet are larger in the conductor patterns at a position farther from the permanent magnet in a direction perpendicular or substantially perpendicular to the coil axis.

4. The actuator according to claim 1, wherein a number of turns of the closest conductor pattern is greater than a number of turns of the at least one other conductor pattern.

5. The actuator according to claim 1, wherein a line width of the closest conductor pattern is narrower than a line width of the at least one other conductor pattern.

6. The actuator according to claim 1, wherein the conductor patterns are provided on both principal surfaces of the at least one insulating base material layer.

7. The actuator according to claim 1, wherein the at least one insulating base material layer is made of flame retardant type 4.

8. The actuator according to claim 1, wherein the conductor patterns are made of copper foil.

9. The actuator according to claim 1, further comprising at least one interlayer connection conductor extending through the at least one insulating base material layer and connecting the conductor patterns to one another.

10. The actuator according to claim 1, wherein each of the conductor patterns includes about one turn.

11. The actuator according to claim 1, wherein the at least one insulating material layer includes a plurality of insulating material layers.

12. The actuator according to claim 1, wherein the at least one insulating material layer includes four insulating material layers.

13. The actuator according to claim 1, wherein each of the at least one insulating material layers is made of a thermoplastic resin.

14. The actuator according to claim 1, wherein the thermoplastic resin includes a liquid crystal polymer.

15. The actuator according to claim 1, wherein the closest conductor pattern includes about two turns.

* * * * *